United States Patent [19]

Draayer

[11] Patent Number: 4,613,969
[45] Date of Patent: Sep. 23, 1986

[54] METHOD FOR CONTROLLING A MULTISTAGE SPACE SWITCHING NETWORK

[75] Inventor: Johannes Draayer, Scottsdale, Ariz.

[73] Assignee: GTE Communication Systems Corporation, Phoenix, Ariz.

[21] Appl. No.: 668,342

[22] Filed: Nov. 5, 1984

[51] Int. Cl.⁴ ............................................. H04Q 11/04
[52] U.S. Cl. .................................. 370/58; 340/825.8; 179/18 GF
[58] Field of Search ............. 370/58, 54; 179/18 GE, 179/18 GF; 340/825.8, 825.79, 825.83

[56] References Cited

U.S. PATENT DOCUMENTS

| | | | |
|---|---|---|---|
| 3,573,384 | 4/1971 | Konidaris et al. | 179/18 GF |
| 3,748,390 | 7/1973 | Gueldenpfennig et al. | 179/18 GE |
| 3,832,500 | 8/1974 | Harris | 179/18 GE |
| 3,843,849 | 10/1974 | Jovic | 179/18 GF |
| 3,916,124 | 10/1975 | Joel | 179/18 GE |
| 3,993,871 | 11/1976 | Hjortendal et al. | 179/18 GE |
| 4,004,103 | 1/1977 | Liu et al. | 179/18 GF |

*Primary Examiner*—Douglas W. Olms
*Attorney, Agent, or Firm*—Frank J. Bogacz; Peter Xiarhos

[57] ABSTRACT

This invention is a cost efficient method for controlling a multistage space switching network for high voltage applications. This method minimizes the number of control signal leads required to operate a multistage space switching network. If a switching network has N space switching stages, then the present invention provides for performing the space switching function with N+1 control signal leads. The present space switching method may also be employed for conventional non-high voltage space switching applications.

12 Claims, 3 Drawing Figures

4,613,969

METHOD FOR CONTROLLING A MULTISTAGE SPACE SWITCHING NETWORK

BACKGROUND OF THE INVENTION

The present invention pertains to an electromechanical space switching network and more particularly to an arrangement for minimizing the number of control leads required to operate a multistage network.

Modern switching systems typically incorporate fully electronic time and space switching networks in their design and implementation. Examples of such switching systems include the GTD-5 EAX manufactured by GTE Communication Systems Corporation and No. 5 EES manufactured by Western Electric.

All switching systems require a network, which is capable of switching relatively high voltages for such functions as subscriber line ringing and coin control functions. These networks are auxiliary networks and not part of the voice or data switching path. These auxiliary networks are line or service circuit concentrator networks. With currently existing technology, use of fully electronic networks to switch high voltages is costly and, therefore, of little use in modern switching systems.

Conventional electromechanical switching network components and techniques are not always compatible with these modern switching systems designs. Furthermore, these conventional electromechanical switching networks require a number of control leads in order to operate the network. Any reduction in the number of control leads results in more efficient packaging of printed circuit boards. Also, network control is made simpler by the reduction of control signals.

SUMMARY OF THE INVENTION

In a space switching network, a method for controlling a multistage network first selects an idle path from a number of paths through the switching matrices of the space switching network. Next, a number of network parameters are formulated. These parameters correspond to the idle path which has been selected for transmission through each switching matrix.

Then, these switching parameters are grouped into two sets. These two sets correspond to the selected idle path. These sets of parameters are stored in registers and transmitted to the switching matrices at the appropriate time.

Horizontal and vertical control signals are generated from these sets of parameters. Certain of these horizontal and vertical controls are shared between switching matrices, such that, a vertical control signal of one matrix is also a horizontal control signal in the next switching matrix. Lastly, latching means in each switching matrix, which are connected to the corresponding vertical and horizontal control signals via corresponding leads, are simultaneously operated to establish a physical signal path from an inlet of the first switching matrix to an outlet of the last switching matrix. This path is the idle path which was previously selected.

A BRIEF DESCRIPTION OF THE DRAWINGS

DESCRIPTION OF THE PREFERRED EMBODIMENT

Figure 1:
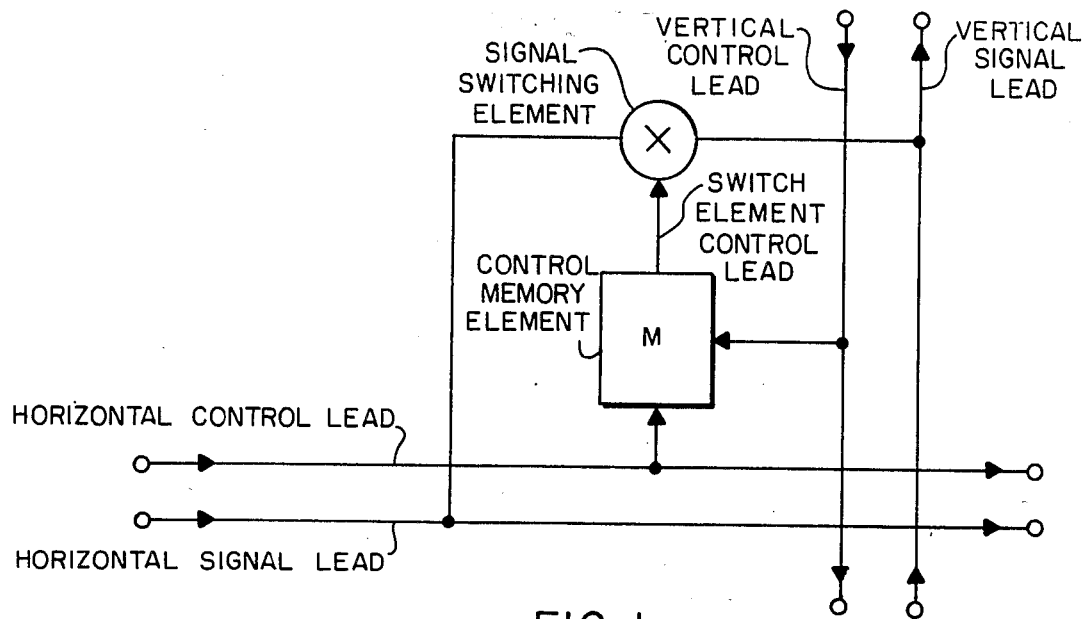
FIG. 1 is a schematic diagram of a crosspoint configuration utilized in the switching network embodying the present invention.

Referring to FIG. 1, a crosspoint connection for a space switching network is shown. As diagrammatically pictured, two elements are provided at the intersection of each horizontal line and each vertical line of a space switching network. The first element is a crosspoint switching element X, which when activated establishes a signal path between a particular horizontal signal lead and a particular vertical signal lead. The crosspoint switching element X may comprise ferreed, relay device or other metallic contact device. These electromechanical crosspoints are used to switch high voltage signals such as, subscriber line ringing or coin control functions. This network configuration may also be applied to voice or data networks. For a voice or data network application, the signal switching element or electromechanical crosspoint would be replaced with an electronic crosspoint. This electronic crosspoint would sufficiently handle the relatively low voltages associated with voice and data transmission.

The second element required to complete a signal switching path is the control memory M. The control memory element M operates in response to two control signals, a horizontal control lead and a vertical control lead. In response to the simultaneous occurrence of both the vertical and horizontal control lead signals, the control memory element M produces the switching element control signal, which is transmitted to be signal switching element X. Therefore, in order to complete a connection through a stage of space switching matrix, a vertical and a horizontal control lead signal is supplied to the appropriate control memory element M in order to activate its corresponding signal switching element X to establish a path between a corresponding horizontal signal lead and a vertical signal lead.

The signal switching element X may comprise a an electromechanical crosspoint, such as, a miniature single winding DIP (dual in-line package) relay or a ferreed type.

Figure 2:
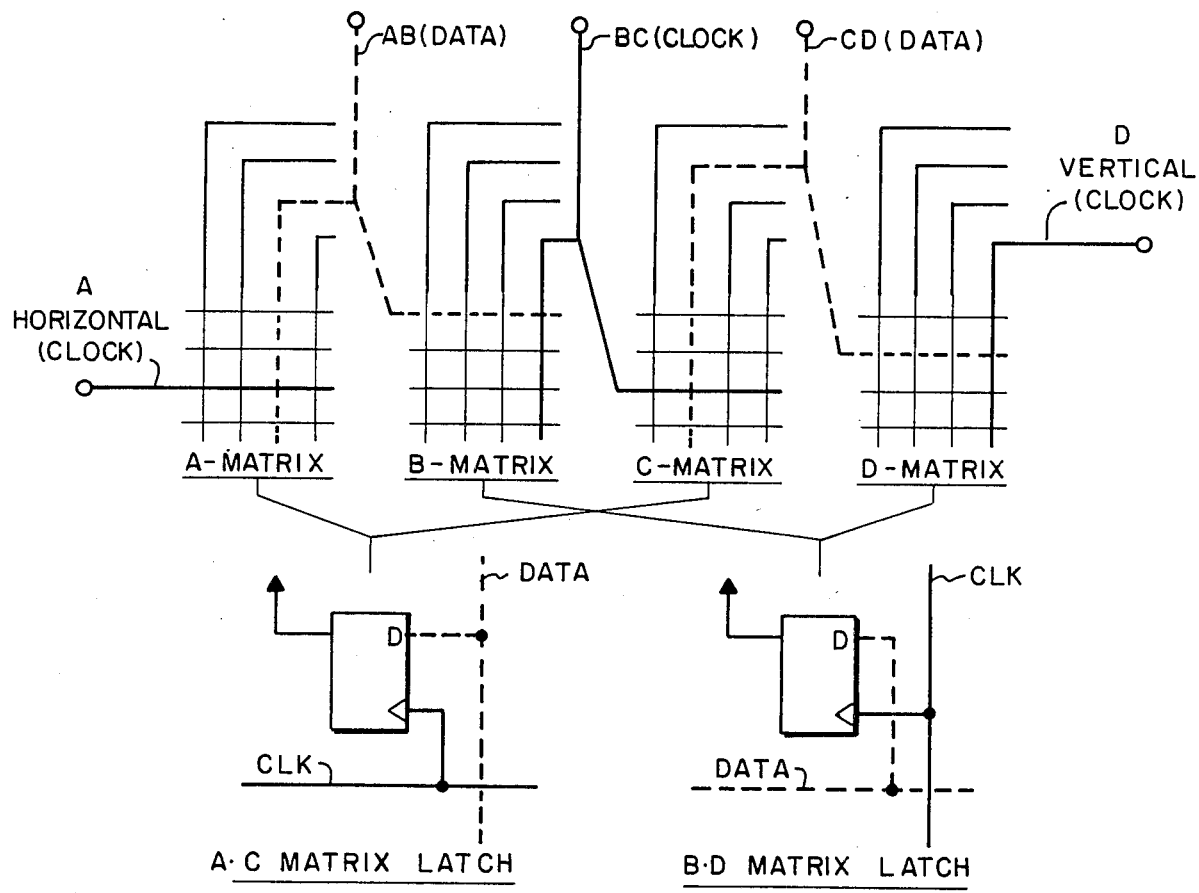
FIG. 2 is a schematic diagram showing the implementation of a multiple stage switching network of the present invention.

Referring to FIG. 2, a four stage space switching network is shown. The switching matrices A through D are represented by the intersection of horizontal and vertical lines. A four stage space switching network is shown, although, the present invention would be applicable to a space switching network with any number of switching stages.

Each space switching matrix requires two signals in order to select a path through the matrix. These two signals are a horizontal control signal and a vertical control signal. In a conventional space switching network, control signals are usually independently generated for each matrix stage. Therefore, a four stage network as shown in FIG. 2 would require eight control signals, a vertical control signal and a horizontal control signal for each of the four stages. In the present invention, N switching matrices may be operated with N plus 1 control signals. For example, the four stage switching network, shown in FIG. 2, may be operated with five control signals.

For drawing simplicity only one matrix of each matrix stage is shown. In an actual network configuration, each stage would include several switching matrices. For example, the A matrix shown would be connected to several other B matrices (not shown); in addition to the connection to the particular B matrix shown in FIG. 2. This is true for each matrix stage. These interconnections between the matrix stages are called links and the interconnection pattern is called the fabric of the network.

Each intersection of the network matrix horizontals and verticals comprises a network switching element as shown in FIG. 1. The signal switching element for this configuration is a crosspoint. The control memory element in the configuration in FIG. 1 is a D-type latch, as shown in FIG. 2.

To establish a connection through the space switching network shown in FIG. 2, a path must be established from an A Horizontal through the A, B, C and D matrices to a D vertical lead. In order to establish the sample network connection shown in FIG. 2 in dark solid and dashed lines, an active data signal is provided to the AB and CD leads; while, a clock signal is applied to the A horizontal, BC and D vertical leads. The A horizontal signal, which is a clock signal, is connected to the A matrix as a horizontal control signal. The AB signal, which is a data signal, is connected to the A matrix as a vertical control signal and is connected to the B matrix as a horizontal control signal (shown in the heavy dashed lines of FIG. 2).

The switching element at the intersection of the A horizontal signal (shown in the heavy solid line) of matrix A with the AB lead will be operated and a signal path will be established from the horizontal input to the A matrix (shown in heavy solid line) through the AB vertical signaling lead to the B matrix (shown in heavy dashed lines). The configuration of the D-type latch for the A matrix and C matrix is shown in lower left portion of the sketches of these matrices. The connection of the D-type latches for the B and D matrices is shown in the lower right portion of FIG. 2.

In the A matrix, the vertical data control signal, shown in dashed lines, is connected to the D input of the latch; and, the horizontal clock control signal is connected to the clock input of the latch. When these two control signals are active, the crosspoint associated with the latch is closed and connects a signal path through the A matrix.

Coincident with the operation of the A matrix, the AB (data) signal, which is also the horizontal control signal of the B matrix, operates along with the BC (clock) signal, which is a vertical control signal of the B matrix, to switch a path through the B matrix. As a result, the D-type latch at the intersection of these two control signals is enabled and operates its corresponding B matrix crosspoint. The crosspoint establishes the connection from the A matrix through the B matrix via the dashed heavy line and the heavy solid line shown as the BC signal to the C matrix. The heavy solid and dashed lines indicate both the control signals and the signal leads, as previously shown in FIG. 1.

Simultaneously with the connection of the A matrix and B matrix, a connection is made from the B matrix to the C matrix. The BC signal, which was used as a vertical control signal for the B matrix, is applied to the C matrix as a horizontal control signal (shown in heavy solid line). The CD signal (shown in heavy dotted line) is the vertical control signal for selection in the C matrix. The D-type latch at the intersection of the BC and CD signals is as shown in the lower left portion of FIG. 2. The CD signal is connected to the D input of the latch. When this latch is activated, the corresponding crosspoint to which it is connected is operated to establish the path shown through the C matrix.

Simultaneously with the establishment of paths through the A, B and C matrices, the final path through the D matrix is established. The CD signal which was applied as a vertical control signal to the C matrix, is applied as a horizontal control signal to the D matrix (shown in heavy dotted line). The vertical control signal for the D matrix is the D vertical signal shown in solid dark line. The latch at the intersection of these two signals in the D matrix is as shown in the lower right portion of FIG. 2. The D vertical signal is connected to the clock input of the associated latch; and, the CD signal is connected as the data input of the latch. When an active signal is present on the CD and D vertical leads, the latch is operated and its associated crosspoint produces a path from the C matrix along the CD horizontal to the D vertical and out of the D matrix. As a result, a path is established through the A, B, C and D matrices.

When an active signal or logic 1 is present on the data lead of the D-type latch, together with the application of the clock signal, the latch is operated to store the active signal. As a result, the crosspoint is operated and remains operated for as long as the latch remains set. Each of latches may all simultaneously be reset by applying inactive or logic 0 signal in the presence of the appropriate clock pulses.

The AB signal is a vertical control signal in the A matrix and a horizontal control signal in the B matrix. The AB signal is the data signal applied to the data input of each D-type latch along a particular vertical of the A matrix. Each successive space switching matrix will alternate the use of a clock signal to fulfill the roll of a vertical control signal in one matrix and a horizontal control signal in the next adjacent matrix. For example, the BC signal performs these functions for the B and C matrices respectively. The shared signal for C and D matrices will be a data signal, the CD signal. Addition of subsequent matrices to this configuration would be accomplished by alternately sharing data and clock signals as shown in FIG. 2.

Figure 3:
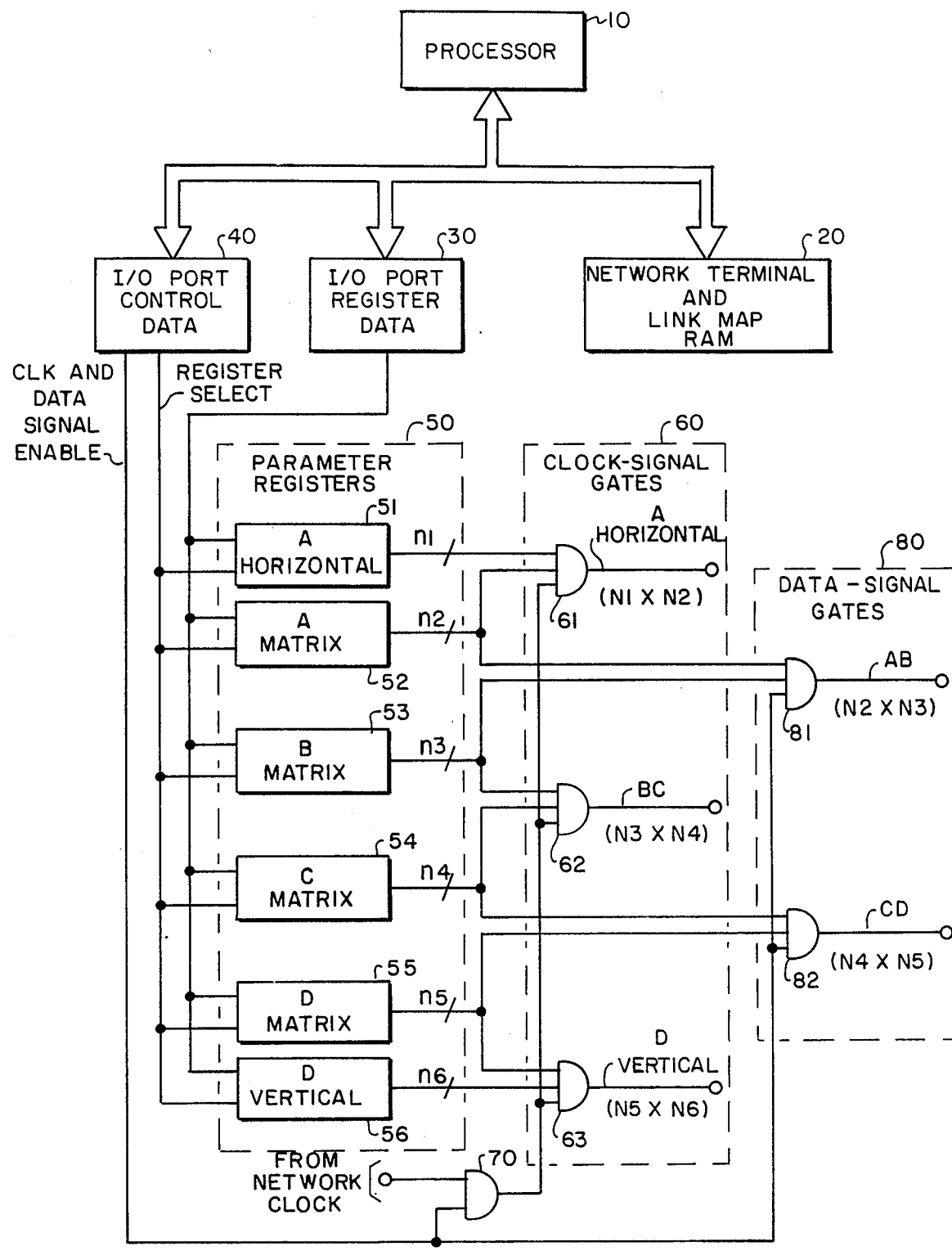
FIG. 3 is a block diagram of the control portion for the switching network embodying the present invention.

Referring to FIG. 3, the control logic which produces the required data and clock control signals is shown. Processor 10, which may be implemented with the microprocessor, is connected to network terminal and link map 20. Network terminal and link map 20 indicates whether particular network links are busy or idle. This indication is accomplished by setting a particular bit or resetting a particular bit corresponding to each network link. In addition, processor 10 also includes other local memory for storing the processor's operating program.

The processor scans the network terminal and link map 20 for a combination of idle network links with which to connect a path through the network matrices. When a particular network path has been selected by the processor 10, each bit which indicates the busy/idle status of a particular link is marked busy, set to logic 1.

Processor 10 is further connected to I/O port 40, which transmits control data. The I/O ports 30 and 40 are connected to the parameter registers 50. Each of the parameter registers 51 through 56 is connected to both I/O port 30 and I/O port 40. One parameter register is required for each category of network fabric parameters.

Each parameter register is a multiple bit register. The size of each parameter register is determined by the number of variables within a given parameter type. The width or size of the A horizontal parameter register 51 is N1. This corresponds to the number of inlets per A matrix. Each of the A matrices in the switching network has the same number of inlets. A matrix parameter register 52 is wide enough to contain the number of A matrices in the switching network, N2. Similarly, B matrix 53, C matrix 54 and D matrix 55 parameter registers are of sufficient size to indicate the number of, C and D matrices, N3, N4 and N5 respectively. In addition, D vertical parameter register 56 is of sufficient to contain the number of outlets per D matrix, N6.

In order to establish a particular path through the network, processor 10 selects an idle path by scanning network terminal and link map 20. When an idle path is found, processor 10 transmits the identity of each inlet and outlet via I/O port 30 to the respective parameter registers 51 through 56. A bit is set in each parameter register 51 through 56 corresponding to the particular path which is selected.

In order to derive the horizontal and vertical control signals shown in FIG. 2, the outputs of the parameter registers 50 are gated through clock signal gates 60 and data signal gates 80. Parameter registers 51 and 52 are connected to a number of AND gates represented by AND gate 61. In order to derive control signals for each A horizontal, one AND gate, 61, must be enabled. The number of A horizontal AND gates 61 is calculated by multiplying the size of the A horizontal parameter register 51 times the size of the A matrix parameter register 52 or N1 times N2. For example, if there are four inlets per A matrix equal to N1, and sixteen A matrices equal to N2, then, it is required that 64 A horizontal AND gates 61 be connected to the parameter registers 51 and 52. The connection of the parameter registers 51 and 52 to the AND gates 61 is in a matrix fashion so that one AND gate 61 will respond when a particular inlet represented by parameter register 51 and a particular matrix represented by parameter register 52 is selected.

Similarly the number of AND gates 62, which are connected to parameter register 53 and 54, is found by multiplying N3 times N4. The number of AND gates 63 is found by multiplying N 5 times N 6, which corresponds to the number of D matrices multiplied by number of outlets.

When the proper clock signal gates 61, 62 and 63 are selected which represent the particular A horizontal, BC link and D outlet respectively, these gates are enabled at the appropriate time. This is accomplished by AND gate 70, which gates the network clock with a signal transmitted via I/O port 40 by processor 10. As a result of processor 10 transmitting the enabling signal and the coincidence of this enabling signal with the network clock, the appropriate ones of AND gate 61, 62 and 63 are enabled to operate the corresponding D-type latches of the network.

A similar operation exists for deriving the data control signals by data signal gates 80, as did for deriving the clock control signals by clock signal gates 60. The number of AND gates represented by AND gate 81 is equal to N 2, the number A matrices, multiplied by N 3, the number B matrices. This is the number of AB links. For example, if the number of A matrices is 16 and the number of B matrices is 4, there would be 64 AND gates 81 which is the number of AB links. Parameter registers 51 and 52 are connected to data signal gates 81 in a matrix fashion so that one gate is selected for the concurrence of the parameter registers 52 and 53. Similarly, AND gates 82 are connected to parameter registers 54 and 55. The number of AND gates 82 is equal to the number of C matrices, N 4, multiplied by the number of D matrices, N 5.

Simultaneously with enabling the clock signal gates 60, processor 10 via I/O port 40 operates the data signal gates 81 and 82, to generate the AB and CD data signals. The AB and CD data signals serve to operate the D-type latches at the intersection of the various verticals and horizontals of the network matrices, as indicated above.

When the path through the space switching matrix is required to be disconnected, processor 10 again operates all parameter registers 50, but indicates a logic 0 for each of the data signal gates 80. The clock signal gates 60 are operated the same as for establishing the connection. As a result, on the next clock cycle, each of the D-type latches which was set, now has a logic 0 clocked in at data and becomes reset. In addition, the corresponding crosspoint is released and the connecting path opened.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a space switching network, a method for controlling a multistage network comprising the steps of:

selecting an idle path from a plurality of paths through a plurality of switching matrices of said space switching network;

said step of selecting an idle path including the steps of:

selecting a path through said plurality of switching matrices; and testing map indicators, associated with each switching matrix, to determine whether said selected path through said switching matrix is idle;

said method for controlling a multistage network further including the steps of:

iterating said steps of selecting a path and testing map indicators until an idle path through each of said plurality of switching matrices has been determined;

marking said map indicators of said determined idle path to indicate said idle path as being presently busy;

formulating a plurality of parameters corresponding to said selected idle path through each said switching matrix;

said step of formulating including the steps:

setting logic one in bit positions of a plurality of parameter words corresponding to said selected idle path through each of said switching matrices; and writing said plurality of parameter words into a corresponding plurality of parameter registers;

said method for controlling a multistage network further including the steps of:

transmitting a first set and a second set of said formulated parameters from a plurality of register means, said first and second sets of said parameters corresponding to said selected idle path;

generating a plurality of horizontal and vertical control signals from said first and second sets of transmitted parameters; and simultaneously operating at least one D-type latching means of each switching matrix in response to said generated horizontal and vertical control signals to establish a physical signal connection from an inlet of a first switching matrix to an outlet of a last switching matrix.

2. A method for controlling a multistage network as claimed in claim 1, said step of generating comprising the steps of:

first gating certain ones of said parameter registers to produce said first set of formulated parameters; and second gating certain ones of said parameter registers to produce said second set of formulated parameters.

3. A method for controlling a multistage network as claimed in claim 2, said step of generating further comprising the step of first enabling said first set of formulated parameters to be transmitted to said plurality of switching matrices in response to a network clock signal and a processor control signal.

4. A method for controlling a multistage network as claimed in claim 3, said step of generating further including the step of second enabling said second set of formulated parameters to be transmitted to said switching matrices in response to said processor control signal.

5. A method for controlling a multistage network as claimed in claim 2, said step of first gating including the step of AND-gating.

6. A method for controlling a multistage network as claimed in claim 2, said step of second gating including the step of AND-gating.

7. A method for controlling a multistage network as claimed in claim 3, said step of first enabling including the step of AND-gatting said processor control signal with said network clock signal to produce a first enabling signal to enable transmission of said first set of formulated parameters.

8. A method for controlling a multistage network as claimed in claim 4, said step of simultaneously operating including the step of first connecting said first set of formulated parameters, said first parameter of said first set being connected as a horizontal control signal of said first switching matrix and said second parameter of said first set being connected as a vertical control signal of said second switching matrix and being connected as a horizontal control signal of said third switching matrix.

9. A method for controlling a multistage network as claimed in claim 8, wherein there is further included the step of repeating the step of claim 8 for each of said formulated parameters of said first set.

10. A method for controlling a multistage network as claimed in claim 8, said step of simultaneously operating further including the step of second connecting said second set of formulated parameters, said first parameter of said second set being connected to said first switching matrix as a vertical control signal and being connected to said second matrix as a horizontal control signal.

11. A method for controlling a multistage network as claimed in claim 10, wherein there is further included the step of repeating the step of claim 10 for each of said formulated parameters of said second set.

12. A method for controlling a multistage network as claimed in claim 10, said step of simultaneously operating further including the step of simultaneous latching said one latching means in each switching matrix, which is operated in response to a particular horizontal and vertical control signal to produce said physical signal connection.

* * * * *